R. H. LOWE.
CAR COUPLING.
APPLICATION FILED FEB. 14, 1922.

1,432,728.

Patented Oct. 17, 1922.

WITNESSES
R. E. Rousseau

INVENTOR
R. H. Lowe,
BY
ATTORNEYS

Patented Oct. 17, 1922.

1,432,728

UNITED STATES PATENT OFFICE.

ROSS HOWARD LOWE, OF HANOVER, PENNSYLVANIA, ASSIGNOR, BY DIRECT AND MESNE ASSIGNMENTS, TO AMERICAN FLYER MANUFACTURING COMPANY, OF CHICAGO, ILLINOIS, A CORPORATION OF ILLINOIS.

CAR COUPLING.

Application filed February 14, 1922. Serial No. 536,453.

*To all whom it may concern:*

Be it known that I, ROSS H. LOWE, a citizen of the United States, and a resident of Hanover, in the county of York and State of Pennsylvania, have invented certain new and useful Improvements in Car Couplings, of which the following is a specification.

My present invention relates to car couplers and my object is the provision of a simple inexpensive construction which will be strong, durable and effective in those uses to which a simple inexpensive car coupler of this type is adapted.

Figure 1:
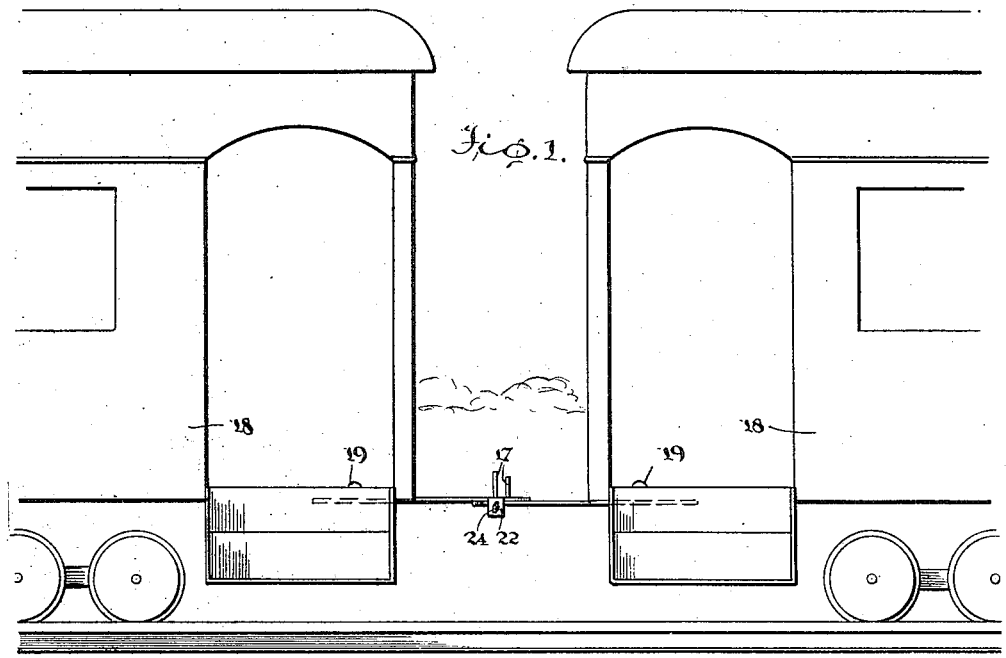
Figure 2:
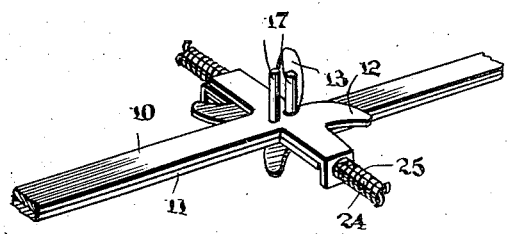
Figure 4:
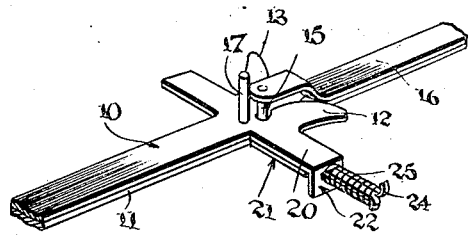
Figure 3:
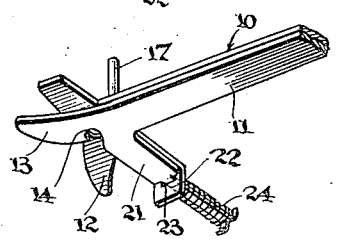

In the accompanying drawing which illustrates my present invention and forms a part of this specification, Figure 1 is a side view illustrating the practical application of the invention, Figure 2 is a detail perspective view of portions of two couplers engaged as in Figure 1, Figure 3 is a detail perspective view of a single coupler, and Figure 4 is a detail perspective view illustrating a single coupler in engagement with a coupling yoke.

Referring now to these figures, and bearing in mind that the coupler of my invention is adapted for both double and single use, my invention proposes a coupler including a pair of normally alined superimposed coupling bars 10 and 11, each having an endwise integral extension at one end, located upon one side of its longitudinal axis. The endwise extension of the bar 10 appears at 12 while that of the bar 11 is shown at 13, it being noted that these endwise extensions are divergently projected, or at least divergently related to the extent that their inner adjacent faces are divergently curved in an outward direction. At the inner end of its outward extension, each coupling bar has a curved undercut recess 14, these recesses coacting in the normal alined positions of the bars to provide an opening for the reception of a coupling pin, whether that coupling pin be a yoke carried coupling pin 15 as seen in connection with the coupling yoke 16 of the single form of coupling as in Figure 4 or the upright pin 17 of a second coupling in the double form of coupling shown in Figures 1 and 2, each coupling having the pin 17 extending upwardly from its upper bar 10 rearwardly of its recess 14 so as to normally serve as a handle for the lateral shifting of one bar with respect to the other.

Adjacent to their inner ends, the coupling bars 10 and 11 of each coupler are connected to their respective vehicle 18 or the like as seen in Figure 1, by means, as for instance a pivot bolt or pin 19, which permits the coupling bars to swing laterally with respect to one another or at least permits one of the bars to swing laterally with respect to the other.

Adjacent to their outer ends and thus adjacent to the endwise projecting wing 13, the bars 10 and 11 are provided with lateral extensions 20 and 21, the former overlying the latter and provided at the extremity of the latter with a downturned flange 22 provided with a slotted opening 23 outwardly through which an extending pin 24 of the extension or arm 21 projects, this pin 24 supporting a coil spring 25 which bears inwardly against the outer face of the flange 22 so as to normally hold the bars 10 and 11 in properly alined relation, and resist lateral swinging movement of one bar relative to the other.

Thus in action the spring 25 permits of lateral yielding of the guide wings 12 and 13 between which a coupling pin is shifted so that the pin may pass into the coacting recesses 14 where it is held when the coupling bars swing back to normal position under the tension of spring 25, and it is obvious from this that the coupler, in so far as coupling action is concerned, is entirely automatic. To release the coupler, the handle pin 17 is grasped and the bar 10 shifted laterally against the tension of spring 25 so that the coupling pin previously engaged within the recesses 14, may be released.

The extensions, that is both endwise and lateral extensions, of the coupling bars 10 and 11, being thus integral, and being in the same plane with the coupling bars themselves, it is quite obvious the two major parts of the coupling at least may be stamped from single pieces of material the weight and thickness of which will of course depend upon the particular use to which the coupler is to be put and it becomes obvious that the coupler proposed by my invention is for this reason extremely simple and inexpensive, while at the same time capable of effective use and automatic action as will be readily seen from the foregoing description.

I claim:

A coupler consisting of a pair of superimposed longitudinally alined coupling bars, one of which is laterally swingable with respect to the other, said bars having endwise projecting divergently related wings at one end and undercut coacting recesses at the inner ends of said wings, and said bars having laterally projecting arms overlying one another, one arm having an angular slotted flange at its extremity, and the other arm having a lengthwise projecting extension passing through the said slotted flange, and a spring around said extension and bearing against the outer surface of said flange.

ROSS HOWARD LOWE.